United States Patent [19]

Barbieri

[11] 4,448,273
[45] May 15, 1984

[54] ENDLESS TRACK ATTACHMENT FOR A VEHICLE

[76] Inventor: Louis C. Barbieri, Seattle, Wash.

[21] Appl. No.: 332,087

[22] Filed: Dec. 18, 1981

[51] Int. Cl.³ .............................................. B62D 55/04
[52] U.S. Cl. ................................. 180/9.21; 180/9.26; 305/16; 305/35 R; 305/41; 305/57
[58] Field of Search ................... 180/9.2 C, 9.26, 9.5; 280/28.5; 305/16, 17, 29, 35 EB, 40, 57, 35 R, 38, 41

[56] References Cited

U.S. PATENT DOCUMENTS

| | | | |
|---|---|---|---|
| 3,077,238 | 2/1963 | Nelson | 180/9.5 |
| 3,689,123 | 9/1972 | Barbieri | 305/29 |

FOREIGN PATENT DOCUMENTS

| | | | |
|---|---|---|---|
| 759353 | 5/1967 | Canada | 305/35 EB |
| 55-140663 | 11/1980 | Japan | 305/57 |
| 764868 | 1/1957 | United Kingdom | 305/29 |
| 2089749 | 6/1982 | United Kingdom | 305/35 R |

*Primary Examiner*—John A. Pekar
*Assistant Examiner*—D. Lynn Fugate
*Attorney, Agent, or Firm*—Joan H. Pauly; Delbert J. Barnard

[57] ABSTRACT

A shaft 12 is secured to and is rotatable with a wheel hub of a vehicle. A sprocket wheel 22 is secured to and rotates with the shaft 12 and has evenly spaced apart, tooth-receiving sockets 28 at its periphery. The shaft 12 is mounted on the upper portion of a track supporting frame 42 by a pillow block mount 52 on each side of the sprocket wheel 22. Each mount 52 has housed within it bearing means 54 surrounding the shaft 12. Idler wheels 44 are mounted on the lower portion of the frame 42. An endless track 82 extends about the sprocket wheel 22 and the idler wheels 44. The track 82 has a multiplicity of radially inwardly projecting drive teeth 84 that roll into and out from the sprocket wheel sockets 28 when the vehicle is operated. The drive teeth 84 are of sufficient depth to prevent disengagement of the track 82 from the sprocket wheel 22. The track 82 includes a multiplicity of transverse segments 86 secured together by at least one endless belt 94.

17 Claims, 19 Drawing Figures

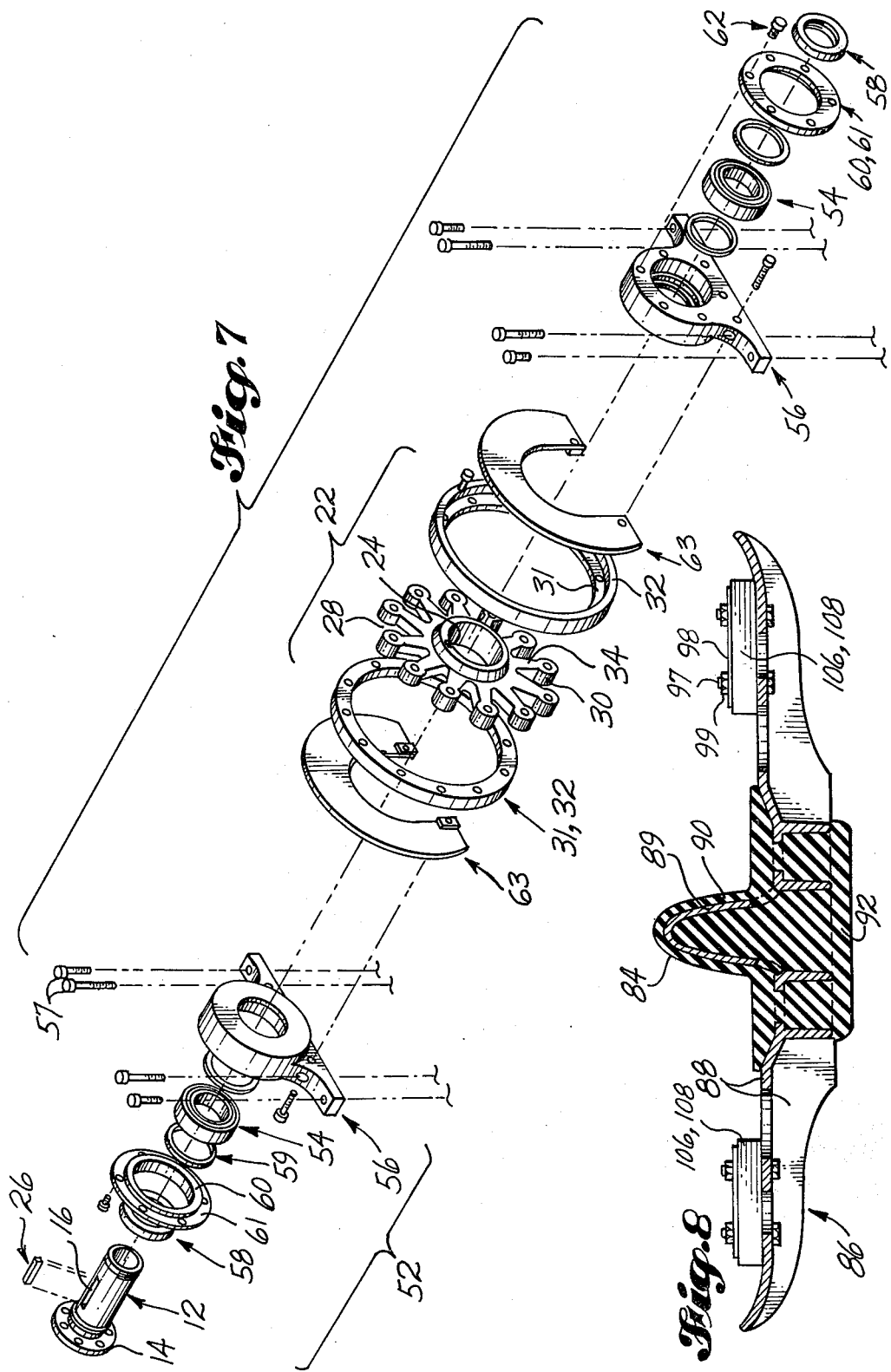

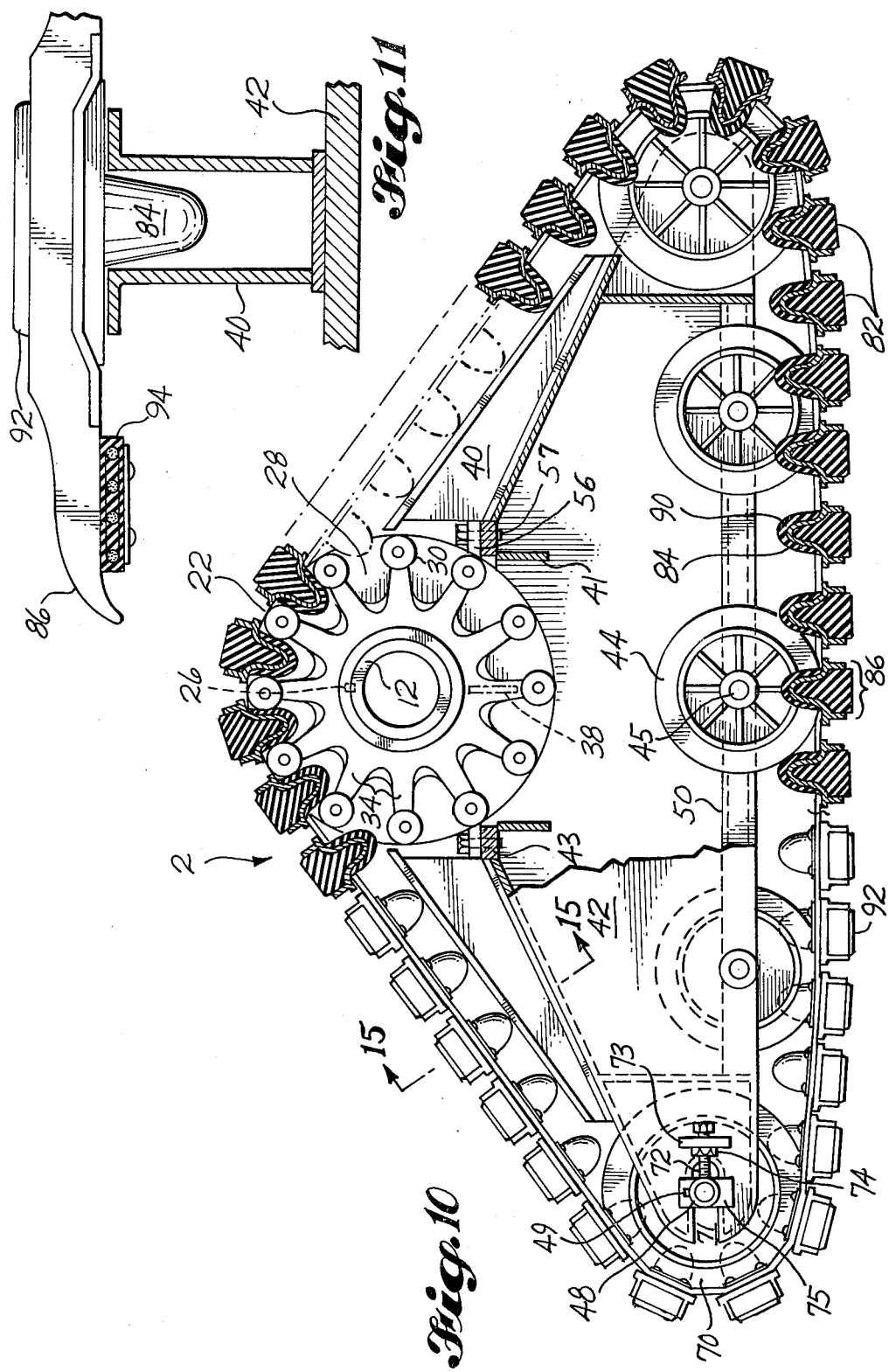

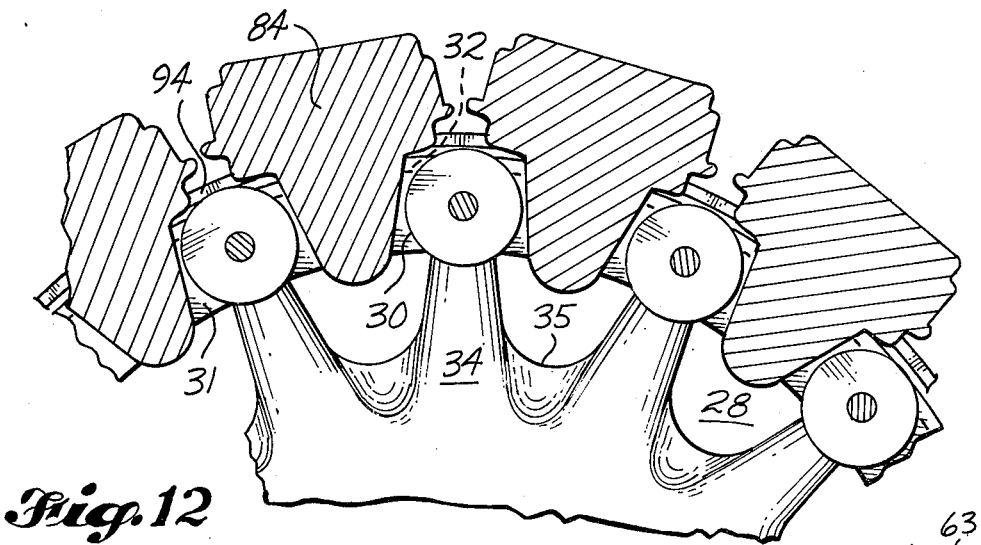
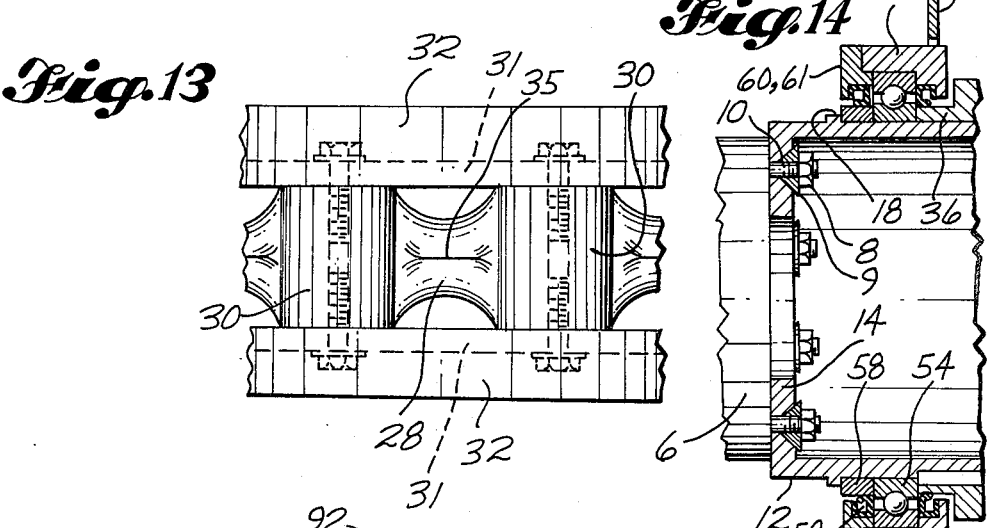
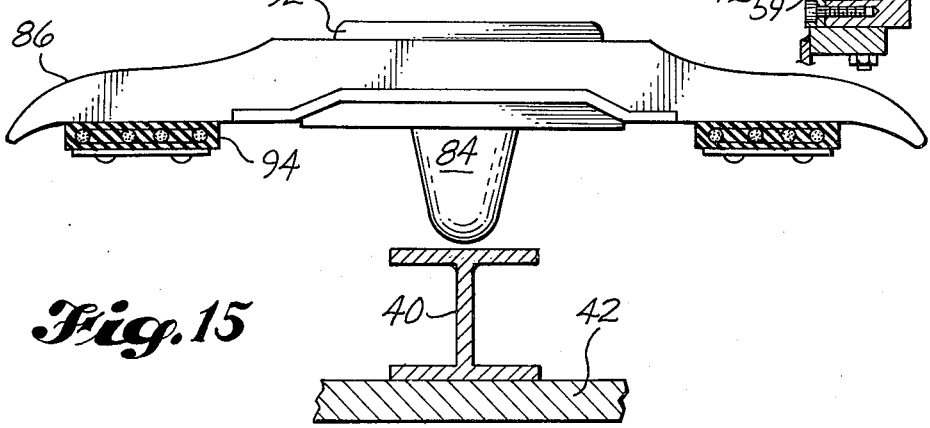

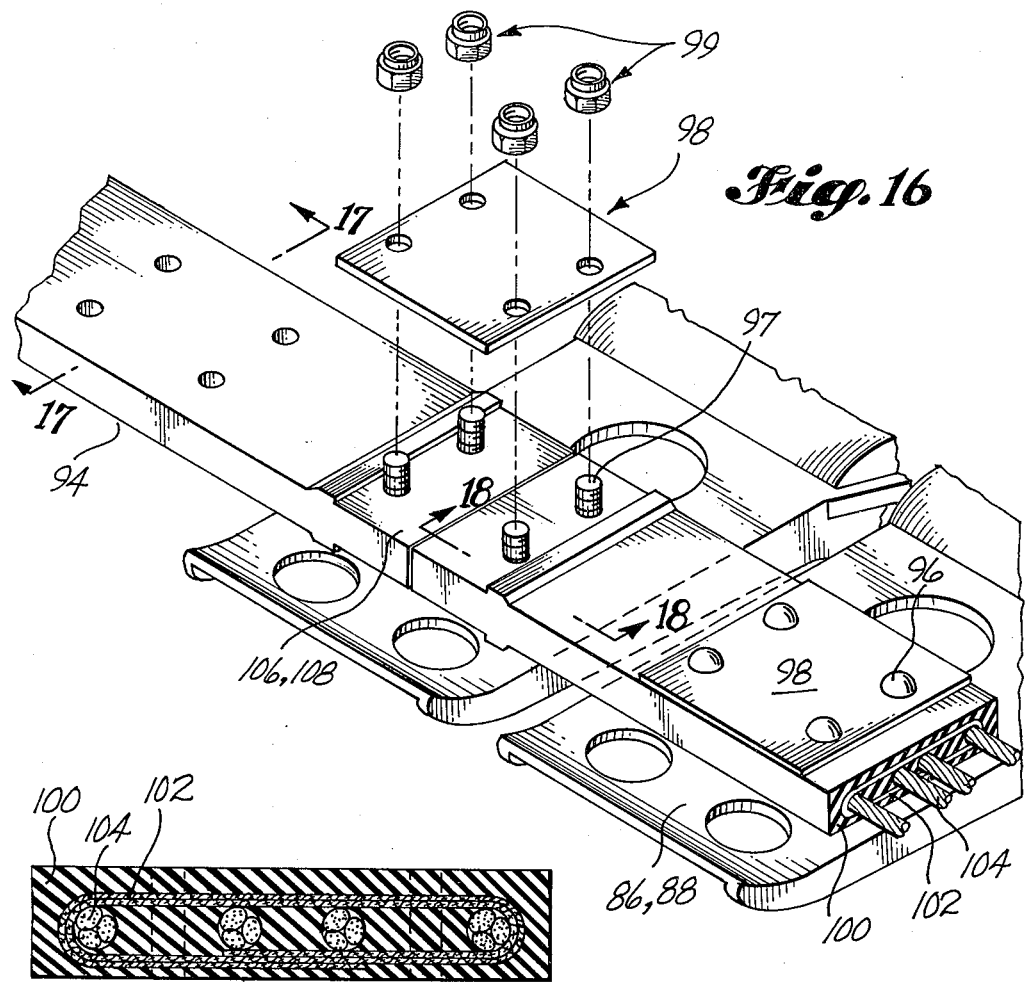
Fig. 16
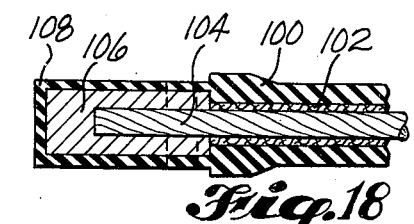
Fig. 17
Fig. 18
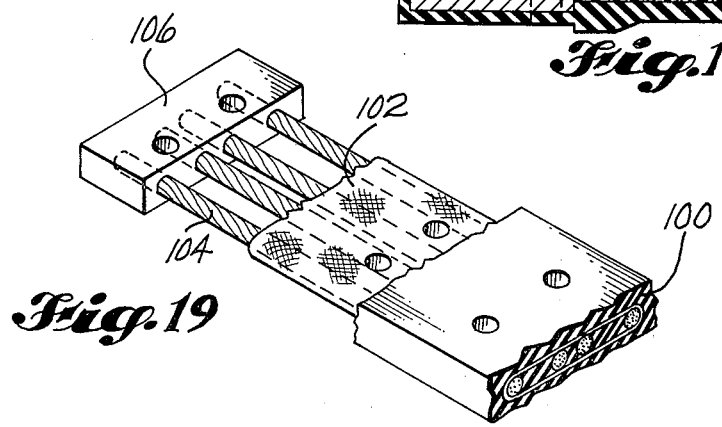
Fig. 19

ENDLESS TRACK ATTACHMENT FOR A VEHICLE

TECHNICAL FIELD

This invention relates to track laying attachments for vehicles and, more particularly, to an attachment that includes a sprocket wheel with improved capability for remaining engaged with the track and a mounting arrangement with improved ability to withstand lateral stresses.

BACKGROUND ART

The present invention is an improvement over the attachment disclosed in U.S. Pat. No. 3,689,123, granted Sept. 5, 1972, to applicant, and entitled Track Laying Attachment For A Vehicle.

DISCLOSURE OF THE INVENTION

The subject of this invention is a track laying attachment for a vehicle. According to a basic aspect of the invention, the attachment includes a shaft, a sprocket wheel that is secured to and rotates with the shaft, and an endless track that has a multiplicity of drive teeth. The shaft has inner and outer ends and a mounting flange at its inner end adapted to be secured to a wheel hub of a vehicle, so as to be rotatable with the wheel hub. The sprocket wheel comprises evenly spaced apart, tooth-receiving sockets at its periphery bounded by bearing surfaces. The attachment also includes a track supporting frame with an upper portion, on which the shaft is mounted by mounting means, and a lower portion, on which idler wheel means are mounted. The mounting means includes bearing means that engage the shaft. The idler wheel means includes portions that define a tooth-receiving passage. The endless track extends about the sprocket wheel and the idler wheel means. The track includes a multiplicity of radially inwardly projecting drive teeth. These teeth are adapted to roll into and out from the sprocket wheel sockets and to travel through the tooth-receiving passage in the idler wheel means. The drive teeth are of sufficient depth to prevent disengagement of the track from the sprocket wheel as the track expands longitudinally.

The above structure allows the drive teeth to be significantly longer than those found in known attachments. A major advantage of having longer drive teeth is that such teeth mesh more firmly with their corresponding sockets and thereby prevent the unintentional disengagement of the track from the sprocket wheel during operation of the vehicle. In order to receive any benefit from longer teeth on the sprocket wheel, the tooth-receiving sockets on the track would have to be correspondingly deeper and, therefore, the track would necessarily be required to be thicker to accommodate the depth of the sockets. The placement of the drive teeth on the endless track, rather than on the sprocket wheel, makes it possible to use longer drive teeth without altering the basic construction of the track.

Locating the sockets on the sprocket wheel also insures that their spacing will remain uniform and will be independent of any stretching or longitudinal extension of the track. Since the sockets are circumferentially spaced around the sprocket wheel, the drive teeth roll more easily into and out from the sockets, automatically adjusting for such stretching or expansion of the track. In contrast, in track laying attachments that have drive teeth on a sprocket wheel and sockets on the track, the sockets are generally rectangular holes bounded by essentially flat surfaces. When there is even a slight expansion of the track, the drive teeth are apt to miss the sockets and strike the surface between the sockets. The result is all too often the disengagement of the track from the sprocket wheel or the breaking off of the drive teeth from the sprocket wheel. The present invention, by placing the drive teeth on the track, avoids both of these undesirable results.

According to another aspect of the invention, the sprocket wheel further comprises two annular rims. Each of these rims includes an inner radially extended portion adjacent to the bearing surfaces and a flange portion extending normal to and outwardly from the inner portion. The flange portions contact and provide support for the track as the drive teeth roll into and out from the sprocket wheel sockets.

According to another aspect of the invention, the track includes a multiplicity of transverse segments. These segments are secured together, and each of them comprises a rigid frame. Each segment includes a drive tooth that comprises a portion of the rigid frame forming a radially inwardly projecting finger, which finger has an elastomeric covering. Preferably, the rigid frame includes at least one hole extending radially therethrough. Also preferably, elastomeric material is molded around the finger and through the hole. The molded material surrounds the finger and forms the elastomeric covering over the finger and an elastomeric pad extending radially outwardly from the rigid frame beneath the drive tooth.

This construction of the track has several advantages. The track is strong and lightweight and has superior durability. The useful life of the track is extended because the elastomeric material protects the rigid frame, and such material can be relatively easily replaced without requiring the replacement of the entire segment. Thus, the basic structure of the track is protected from wear caused by contact with the sprocket wheel and with the surface along which the vehicle is moving, and the track may be easily and inexpensively restored to its original condition by replacing the elastomeric material. In embodiments that contain the preferred feature of an elastomeric covering over the finger that extends outwardly from the finger over transverse contact portions of the rigid frame, further protection for the track segments is provided, and the sprocket wheel is also protected from wear by contact with the track segments because the sprocket wheel only contacts portions of the segments that are provided with an elastomeric covering.

According to an additional aspect of the invention, the track includes an multiplicity of transverse segments, and these segments are secured together by at least one endless belt that is attached to each segment and is substantially circumferentially coextensive with the track. Preferably, the belt comprises an elastomer material reinforced by at least one steel cable. A belt made of such materials is strong, resists stretching, and can easily and inexpensively be replaced as necessary, further extending the useful life of the track.

According to another important aspect of the invention, the mounting means comprises a pillow block mount on each side of the sprocket wheel. The bearing means comprises antifriction bearing means housed within each such pillow block mount. Each of these antifriction bearing means surrounds the shaft and includes a portion that rotates with the shaft and a nonrotating portion.

The pillow block mounts distribute the weight of the vehicle and its load evenly onto the track supporting frame, which in turn distributes the weight onto the track via the idler wheels. The mounts also distribute the external forces acting on the frame, via the idler wheels and track, along the shaft. They provide the track laying attachment with a great deal of strength, and the resulting structure has superior resistance to breakdown caused by lateral stresses.

Still another aspect of the invention has two alternative embodiments, each of which has its own advantages. In the first of these embodiments, the mounting flange extends radially outwardly from the inner end of the shaft. This mounting arrangement for the shaft makes it possible to use a shaft of sufficiently small diameter so that readily available and relatively inexpensive antifriction bearings will fit around the shaft. In the second of these embodiments, the mounting flange extends radially inwardly from the inner end of the shaft, and the shaft is essentially a hollow cylinder. This arrangement provides access to the nuts that secure the mounting flange to the studs on the hub without requiring the removal of the attachment or any of its parts from the vehicle.

The primary object of this invention is to provide a track laying attachment for a vehicle that has superior strength and durability. Other objects of the invention include providing a track laying attachment that can easily and quickly be attached to a vehicle without modification of the vehicle, providing an attachment that will not interfere with the calipers of disc brakes, providing an attachment that is economical to purchase and to maintain, providing an attachment with superior reliability, providing an attachment that will keep a vehicle going on a variety of terrains on which a vehicle with any kind of tires would become bogged down, and providing an attachment that will not cause extensive damage to a paved surface should it become necessary to run a vehicle with the attachment on such a surface.

These and other objects, advantages, and features will become apparent from the detailed description of the best modes for carrying out the invention that follows.

BRIEF DESCRIPTION OF THE DRAWINGS

In the drawings, like element designations refer to like parts throughout, and:

FIG. 7 is an exploded pictorial view of a preferred embodiment of the shaft and the sprocket wheel and pillow mounts that are mounted on the shaft.

FIG. 8 is a sectional view of the track along the line 8—8 in FIG. 5.

FIG. 10 is a vertical sectional view taken along the line 10—10 in FIG. 9, which shows a preferred embodiment of the track supporting frame and to which a portion of the foreground has been added to show the adjustable attachment of the rear idler wheels.

FIG. 11 is a view like FIG. 15, except that a different preferred embodiment of the web is shown.

FIG. 12 is an enlarged scale view of a portion of the sprocket wheel and drive teeth as shown in FIG. 10.

FIG. 13 is a top plan view of a fragment of the periphery of the sprocket wheel shown in FIG. 12.

FIG. 14 is a fragment of a sectional view like FIG. 9, except that a different preferred embodiment of the shaft is shown.

FIG. 15 is a sectional view taken along the line 15—15 in FIG. 10, showing a preferred embodiment of the web on the track supporting frame.

FIG. 16 is a partially exploded pictorial view of fragments of two track segments and one of the endless belts, showing how the sections of the belt are joined and a cross section of the belt.

FIG. 17 is a cross-sectional view of the belt taken along line 17—17 in FIG. 16.

FIG. 18 is a sectional view of one end of a section of the belt taken along line 18—18 in FIG. 16.

FIG. 19 is a fragmented pictorial view of an end portion of one of the belts with parts of the elastomeric jacket and nylon reinforcement peeled away to expose the inner construction of the belt.

BEST MODES FOR CARRYING OUT THE INVENTION

Figure 1:
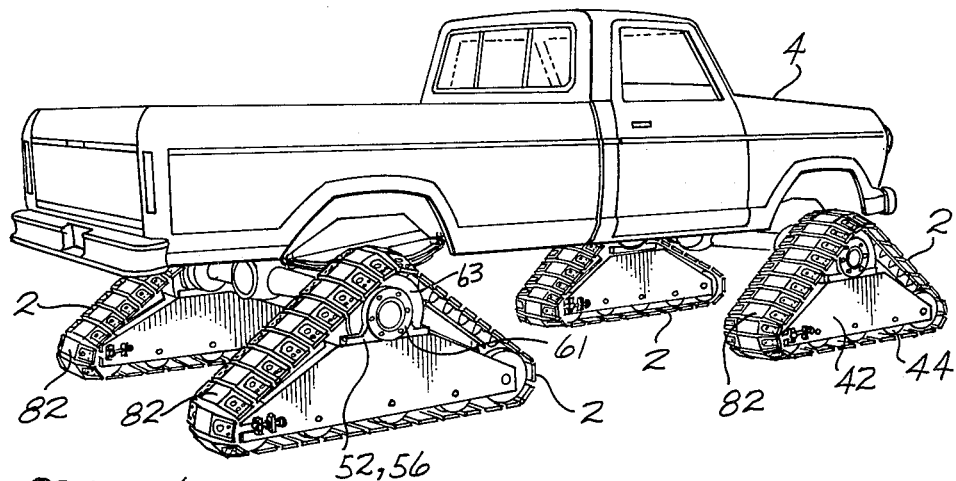
FIG. 1 is a pictorial view of a vehicle equipped with a preferred embodiment of the invention.
Figure 2:
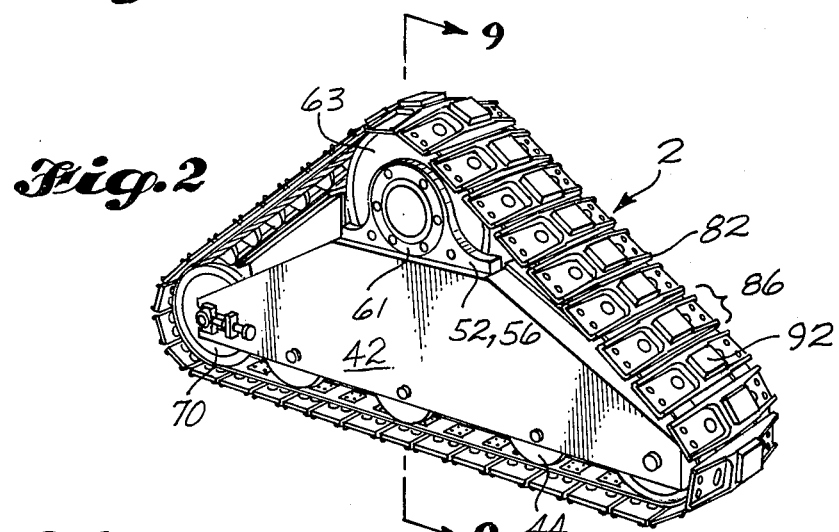
FIG. 2 is a pictorial view of the preferred embodiment shown in FIG. 1.
Figure 3:
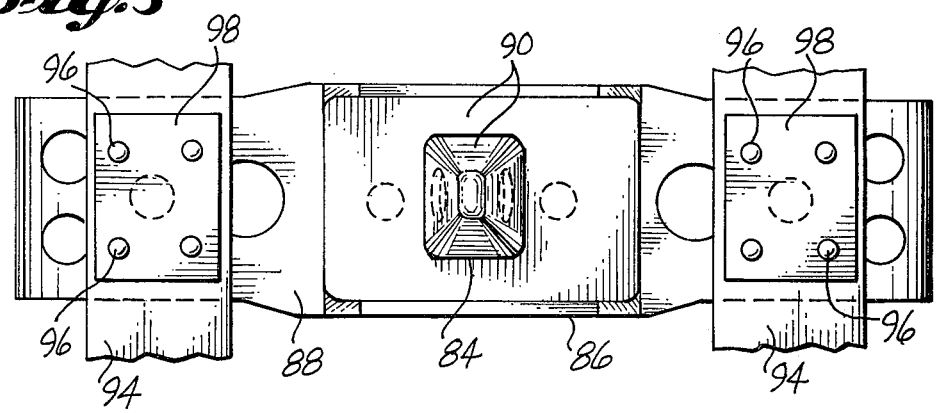
FIG. 3 is a top plan view of one of the segments of the preferred embodiments of the endless track, including portions of the endless belts that are attached to each segment.
Figure 9:
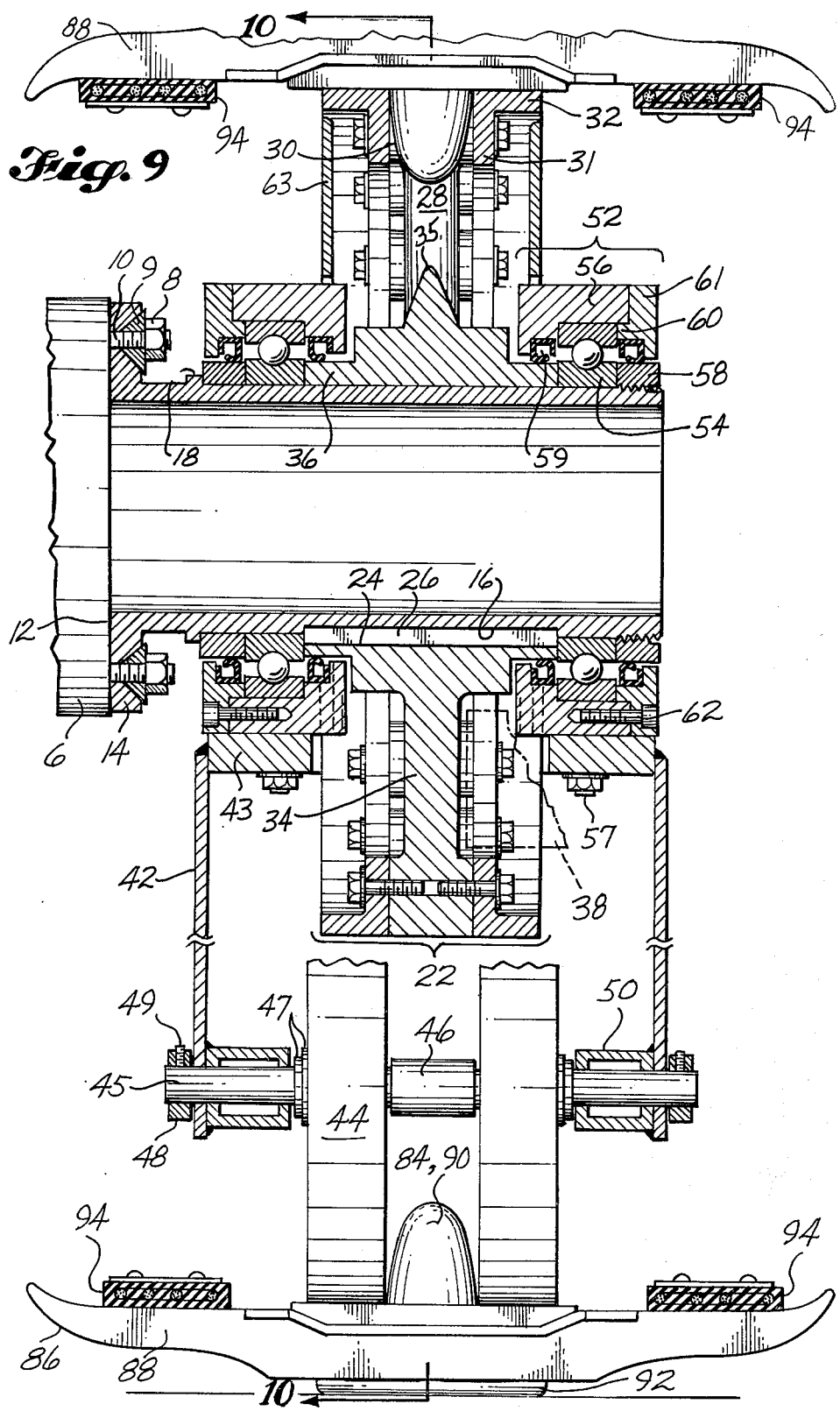
FIG. 9 is a sectional view of the preferred embodiment shown in FIG. 2, taken along the line 9—9 in FIG. 2, with a fragment of a vehicle hub added.

The drawings show the preferred embodiments of a track laying attachment 2 that are constructed according to the invention and that also constitute the best modes of the invention currently known to the applicant. The attachment 2 includes a shaft 12 that has a mounting flange 14 at its inner end adapted to be secured to a wheel hub of a vehicle, such as the truck 4 shown in FIG. 1. When it is so secured, the shaft 12 rotates with the wheel hub. FIG. 9 shows an embodiment in which the mounting flange 14 extends radially outwardly from the inner end of the shaft 12; FIG. 14 shows an alternative embodiment in which the mounting flange 14 extends radially inwardly from the inner end of the shaft 12. The advantages of each of these embodiments are discussed above.

A portion of a typical wheel hub 6 is shown in FIG. 9. The hub 6 has projecting studs 10 onto which a wheel would be mounted and secured by nuts 8. The shaft 12 is mounted in the same manner. To accomplish this, the studs 10 are placed through holes provided in the mounting flange 14 so that they protrude from the outer surface of the flange 14. The shaft 12 is then tightly secured to the hub 6 by placing the nuts 8 on the protruding ends of the studs 10 and tightening them against the outer edge of the flange 14. In order to provide additional protection against disengagement of the shaft 12 from the hub 6, a taper lock is preferably provided on each stud 10. The taper lock has a cone member 9 that is split longitudinally and fits into a frustum-shaped recess that surrounds the outer end of the stud-receiving hole in the mounting flange 14. A self-locking nut 8 is tightened against the outer portion of the cone member 9, forcing the cone member 9 against the walls of the recess.

A drive sprocket, or sprocket wheel 22 is secured to the shaft 12 so as to rotate with the shaft 12. The securing of the sprocket wheel 22 may be accomplished by any of a variety of conventional means, such as the slots 16, 24 and key 26 shown in FIG. 7. The key 26 prevents rotational movement of the sprocket wheel 22 with respect to the shaft 12. Longitudinal movement is prevented by the key 26 and the pillow block mounts 52 that attach the shaft 12 to the upper portion of the track supporting frame 42.

The sprocket wheel 22 has evenly spaced apart, tooth receiving sockets 28 at its periphery. These sockets 28 are bounded by bearing surfaces 30, each of which in the preferred embodiment shown in the drawings is rounded at its periphery to guide the drive teeth 84 into the sockets 28. The spokes 34 of the sprocket wheel 22, which define the bearing surfaces 30, are filleted at their hub ends to strengthen their resistance to shear forces. At the base of each socket 28 is a wedge-shaped blade 35 that shears off snow that enters the socket 28, causing the snow to fall onto the track 82 below and inhibiting the accumulation of snow in the socket 28. Such accumulation is further inhibited by scraper blades 38, described below.

The sprocket wheel 22 also includes two annular rims 31, 32, one on each side of the sockets 28. Each of these rims 31, 32 has an inner radially extended portion 31 that is adjacent to the outer portions of the sockets 28 and the bearing surfaces 30 and that is attached to the heads of the spokes 34 by a plurality of bolts. Each rim 31, 32 also has a flange portion 32 that extends normal to and outwardly from the inner radially extended portion 31. The peripheral surfaces of the flange portions 32 and the peripheral surface portions of the spoke heads form a smooth wheel 22 that is interrupted by the tooth-receiving sockets 28. The flange portions 32 contact and provide support for the track 82 as the drive teeth 84 roll into and out from the sockets 28.

Each scraper blade 38 projects vertically into one side of the sprocket wheel 22 below the shaft 12 and, as the sprocket wheel 22 rotates, scrapes any accumulated snow from the sides of the spokes 34 and sockets 28. The radial extension of the blade 38 is adjusted so that the blade 38 clears the hub of the sprocket wheel 22 and the radially inward end of the inner portion 31 of the rim 31, 32. The clearance between the blade 38 and the spokes 34 is the minimum necessary to prevent contact. Although FIG. 9 shows only one blade 38, it is of course preferable to provide a blade 38 on each side of the sprocket wheel 22. The blade 38 is shown in phantom in the drawings and the attachment to the frame is not shown at all because these elements are very well known. Any appropriate conventional means of attaching the blade may be used.

The shaft 12 is mounted onto the horizontal upper portion 43 of the track supporting frame 42. In the preferred embodiment of the mounting structure, the shaft 12 is mounted by means of two pillow block mounts 52, one on each side of the sprocket wheel 22. An anti-friction bearing 54 is housed within each pillow block mount 52 and surrounds and engages the shaft 12. Each bearing 54 includes a portion that rotates with the shaft 12 and a non-rotating portion. Any standard bearings may be used, but the preferred form is the annular roller bearing 54 shown in FIG. 7.

The various components of the preferred form of the pillow block mounts 52 are most clearly shown in FIG. 7. Each mount 52 includes a pillow block 56 which has a horizontal cylindrical portion that blends downwardly into a transversely extended horizontal base at one end and projects axially at the other end to form a cylindrical flange, the outer end of which is adjacent to the sprocket wheel 22. The base of the pillow block 56 is attached to the horizontal upper portion 43 of the track supporting frame 42 by means of screws 57. The upper portion 43 of the frame 42 typically has a width substantially equal to the distance between the inner end of the inner pillow block 56 and the outer end of the outer pillow block 56. This width, by way of example only, is about ten inches. The upper portion 43 of the frame 42 has a rectangular hole cut out of its center to provide clearance for the sprocket wheel 22. The two pillow blocks 56 are attached on opposite sides of this rectangular hole.

Each pillow block 56 has a circular hole of varying diameter extending coaxially through its cylindrical portion. Starting at the outer end of the cylindrical flange on the pillow block 56 and moving inward, the circular hole increases in diameter in two steps, so that the circular hole has a narrow portion (adjacent to the outer end of the cylindrical flange), an intermediate portion, and a wide portion (adjacent to the end of the cylindrical portion of the pillow block 56 opposite the outer end of the cylindrical flange). The sprocket wheel 22 has a hub portion 36, which includes an annular flange projecting outwardly from each side of the sprocket wheel 22 along the shaft 12. This annular flange is received into the narrow and intermediate portions of the circular hole. A shaft seal 59 is positioned in the intermediate portion of the circular hole radially between the pillow block 56 and the annular flange and makes sealing contact with both the block 56 and the flange.

The bearing 54 is received into the wide portion with one side adjacent to the seal 59 and the end of the annular flange of the hub portion 36. The other side of the bearing 54 is adjacent to a spacer 58 that engages the shaft 12, a second shaft seal 59 positioned radially outward of the spacer 58, and the flange 60 of a flanged retainer 60, 61 positioned radially between the second seal 59 and the pillow block 56. The second seal 59 makes sealing contact with the spacer 58 and flange 60. In addition to the flange 60, which extends axially into the wide portion of the circular hole, the flanged retainer 60, 61 has a radially extended outer portion 61 that is fastened to the end of the pillow block 56 by screws 62 that are spaced circumferentially around the circular hole. The flange 60 and outer portion 61 cooperate to retain the bearing 54 and outer seal 59 in the circular hole. The spacer 58 extends axially outwardly from the circular hole so that its outer end is coplanar with the outer face of the outer portion 61 of the retainer 60, 61.

The bearing 54, spacer 58, seals 59, and retainer 60, 61 are all annular and coaxial with the shaft 12. The seals 59 may be of any of a variety of conventional types, such as the double-lip, spring-loaded seals 59 shown in the drawings.

Each pillow block mount 52 also has a horseshoe-shaped sprocket guard 63 attached to its base and extending upwardly and around the cylindrical flange on the pillow block 56 like a loop on a yoke. This sprocket guard 63 shields the upper portion of the sprocket wheel 22.

The pillow block 56 may be manufactured in various ways. One of these is to cast metal into one integral piece. Another is to cast metal into two pieces and bolt, weld, or otherwise fasten them together. In the latter case, a preferred approach is to make one piece with a shape that is essentially a circle that blends downwardly into a horizontal base and to make the second piece the same shape and size as the flanged retainer 60, 61. In this construction, the first piece is symmetrical and has a circular hole with a uniform diameter, and the steps in the diameter are provided by the second piece.

A variety of means could be employed to secure the pillow block mounts 52 to the shaft 12. In the preferred embodiment shown in FIG. 9, the outer end of the shaft 12 is threaded. The spacer 58 of the outer pillow block mount 52 has corresponding threads and, when the attachment 2 is completely assembled, is in threaded engagement with the outer end of the shaft 12. In addition, the shaft 12 has a circumferential rib 18 projecting outwardly from its outer surface and abutting the end of the spacer 58 that extends out of the inner pillow block 56. This arrangement secures the outer pillow block mount 52 to the shaft 12 and provides security for both mounts 52 and for the sprocket wheel 22 against disengagement from the shaft 12 and against longitudinal movement relative to the shaft 12.

The track supporting frame 42 has an inner side plate and an outer side plate, which extend downwardly from the side edges of the horizontal portion 43 to which the pillow block mounts 52 are attached. Two vertical plates 41 extend between the upper portions of these side plates and project downwardly from the front and rear ends, respectively, of the horizontal portion 43. These vertical plates 41 give the frame 42 additional strength and resistance to deformation. Idler wheels 44 are attached to the lower portions of the side plates so that they rotate between the two side plates. Since the idler wheels 44 must have tooth receiving passages to accommodate the drive teeth 84 on the track 82, in the preferred embodiments the idler wheels 44 are provided in coaxial pairs with the two wheels in each pair being spaced apart axially to provide a tooth receiving passage between them. As shown in the drawings, there are preferably five pairs of idler wheels 44 in order to distribute the weight of the vehicle and its load evenly onto the track 82 and to guide the track 82 as it moves about the idler wheels 44 and the sprocket wheel 22. The preferred diameters of the idler wheels 44 are, by way of nonlimiting example, twelve inches for the front and rear pairs and ten inches for the middle three pairs.

Figure 4:
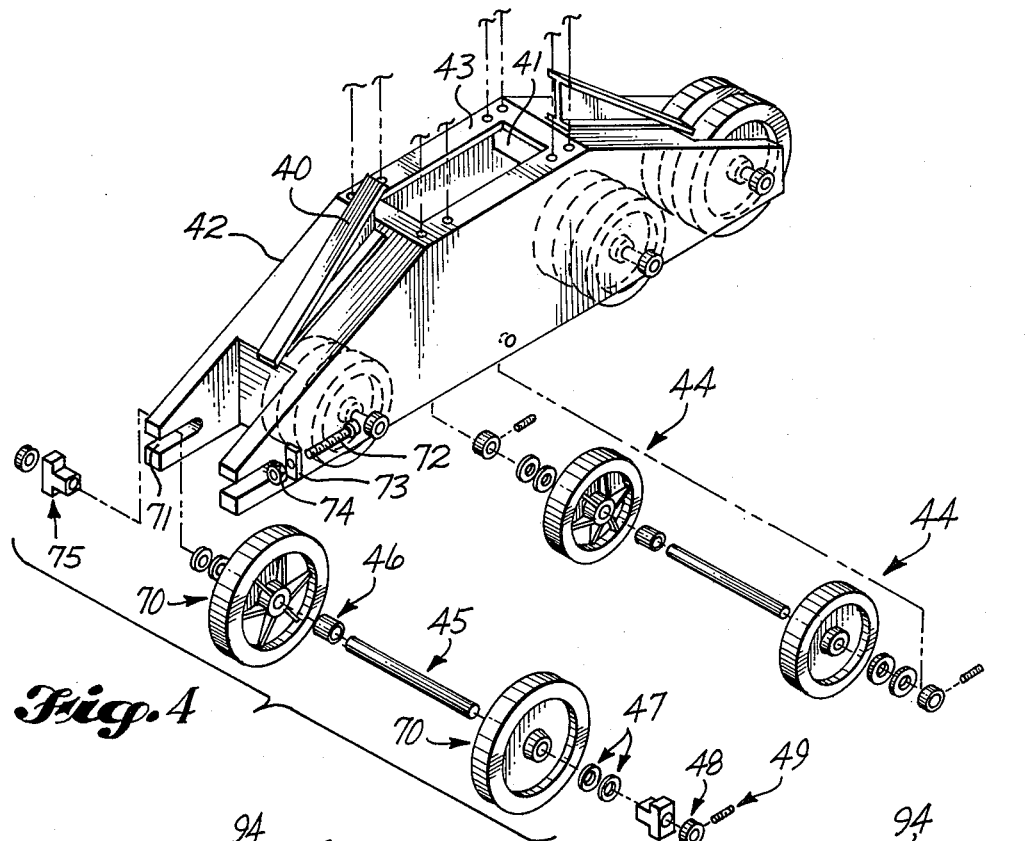
FIG. 4 is a partially exploded pictorial view of a preferred embodiment of the track supporting frame and idler wheels.
Figure 5:
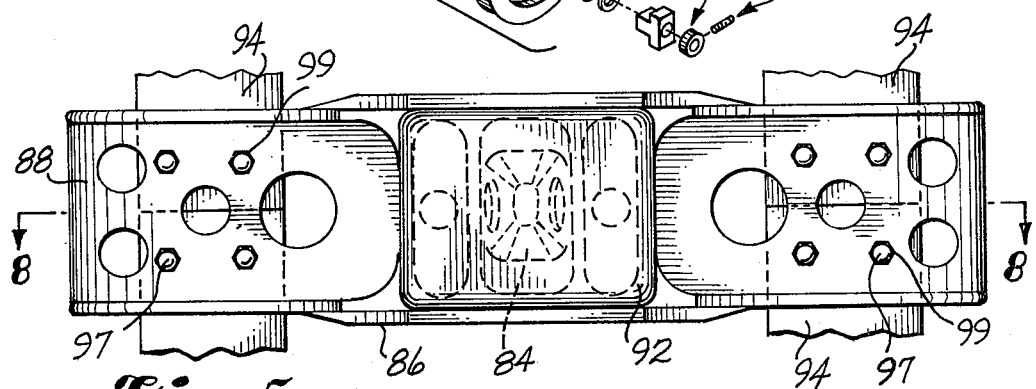
FIG. 5 is a bottom plan view of the track segment shown in FIG. 3, including portions of the endless belts that illustrate how the sections of the belts are joined.
Figure 6:
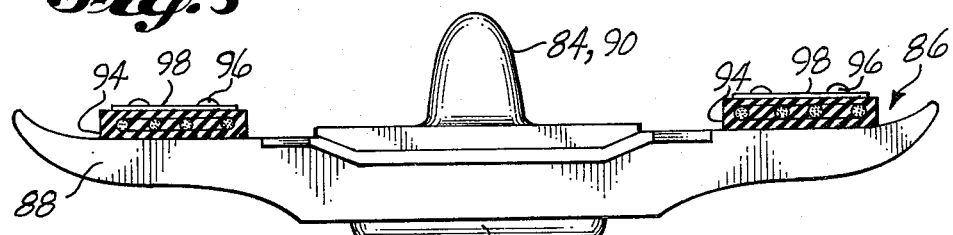
FIG. 6 is a side elevational view of the preferred embodiment of the track segment, including the endless belts in cross section.

The idler wheels 44 may be attached to the frame 42 in any of a variety of conventional ways, such as that shown in the drawings. Referring to FIG. 4, the two wheels of each pair are mounted for rotation on a common axle 45 by means of bushings. One end of the axle 45 protrudes from the outer side of each wheel and receives washers 47. The end of the axle 45 is then received into a hole provided in the lower portion of the corresponding side of the track laying frame 42 and projects out from the frame 42. The end of the axle 45 is prevented from slipping inwardly by means of a collar lock 48 and a set screw 49. Each axle 45 is typically about one inch in diameter and eleven and a half to fourteen inches long.

The correct axial spacing of the two wheels of each pair of idler wheels 44 is important to the efficient functioning of the attachment 2. A spacer 46 is placed on the axle 45 between the two wheels to insure that the wheels remain a sufficient distance apart to form a tooth receiving passage. Means are also provided to insure that the wheels remain sufficiently close together so that they contact the track 82 near the bases of the drive teeth 84 and thereby serve to prevent undesirable lateral wobbling of the track 82 by providing a narrow passage through which the drive teeth 84 travel. In the case of the front and rear pairs of idler wheels 44, such means is provided by reinforcing members on the ends of each side plate of the track supporting frame 42, which reinforcing members give the side plates sufficient thickness so that the idler wheels 44 are automatically correctly spaced. (See FIG. 4). In the case of the three middle pairs of idler wheels 44, such means are two tubes 50 that have essentially square cross sections. A tube 50 is secured, such as by welding, to the inside surface of each side plate of the track supporting frame 42 and runs horizontally along most of the length of the side plate. A horizontal hole is provided in the tube 50 in line with each axle-receiving hole in the side plate. Hence, each of the middle three axles 45 passes through a first collar lock 48, a hole in the inner side plate of the frame 42, a hole in the first tube 50, two washers 47, a first idler wheel 44, the spacer 46, a second idler wheel 44, two more washers 47, a hole in the second tube 50, a hole in the outer side plate, and a second collar lock.

The mounting of the rear pair of idler wheels 70 is modified to permit the easy assembling of the attachment 2 and allow adjustments for variations in the length of the track 82. Instead of being accommodated in holes provided in the lower portions of the sides of the track laying frame 42, the axle 45 on which the rear pair of idler wheels 70 rotates is accommodated in two slots 71 that open onto the rear outer edges of the sides of the frame 42 and extend horizontally inward. Each of the axles 45 extends longitudinally through a T-shaped shaft stop 75, the longitudinal portion of which extends into the slot 71 and the head portion of which is positioned vertically outside the frame 42 and abuts the outer surface of the side of the frame 42 above and below the slot 71. The horizontal positioning of the axle 45 within the slot 71 is determined by a threaded bolt 72, which extends horizontally and rearwardly through a hole in a laterally and outwardly projecting member 73 of the frame 42 and then through a nut 74 and is urged against the head portion of the T-shaped shaft stop 75. The position of the axle 45 is adjusted simply by adjusting the position of the two bolts 72 relative to the respective projecting members 73 of the frame 42. During assembly of the attachment 2, the axle 45 is moved against the inward ends of the slots 71, the track 82 is placed around the sprocket wheel 22 and the idler wheels 44, 70, and then the axle 45 is moved outwardly until the desired fit of the track 82 around the attachment 2 is achieved. Following assembly, rearward sliding of the idler wheels 70 and their axle 45 is prevented by the track 82. As in the case of the other pairs of idler wheels, each projecting end of the axle 45 is secured by means of a collar lock 48 and set screw 49. The axle 45 for the rear pair of idler wheels 70 is longer than the axles 45 for the other pairs since it must accommodate additional elements, namely the T-shaped shaft stops 75.

The track supporting frame 42 also has a rear plate and a front plate, which extend outwardly and downwardly from the rear and front edges, respectively, of the horizontal upper portion 43 to which the mounts 52 are attached. Each of these plates has a wedge-shaped web 40 that extends longitudinally down the center of the plate, tapering in height toward its outer end. In the embodiment shown in FIGS. 10 and 15, the cross sections of the web 40 along its length are shaped like I-beams, and the top of the web 40 just barely clears the tops of the drive teeth 84. In the alternative embodiment shown in FIG. 11, the cross sections of the web 40 are U-shaped with a flange extending outwardly from the top of and perpendicular to each leg of the "U". The two flanges of the web 40 of this latter embodiment just barely clear the top surface of the track 82 adjacent to the bases of the drive teeth 84. In both embodiments, the upper vertical edge of the web 40 is adjacent to the periphery of the sprocket wheel 22, and there is only a little clearance between such edge of the web 40 and the sprocket wheel 22.

The two webs 40, in both embodiments, have several functions. They help to keep flying snow and other debris out of the sprocket wheel 22. Since the tops of the webs 40 barely clear some portion of the track 82, the drive teeth 84 in the embodiment of FIG. 15 and the top surface around the bases of the drive teeth 84 in the embodiment in FIG. 11, the webs 40 prevent the track 82 from sagging more than a very small amount. Should the track 82 sag such small amount, the webs 40 provide support for the track 82. In the embodiment of FIG. 11, the drive teeth 84 project into and travel through the U-shaped channels formed by the webs 40. This provides additional security against lateral wobbling of the track 82. Finally the web structure gives the frame 42 additional strength and resistance to deformation.

An endless track 82 extends around the sprocket wheel 22 and the pairs of idler wheels 44, 70. The track 82 includes a multiplicity of segments 86, which are secured together. The segments 86 are typically five inches across and eighteen inches long and have ⅜ inch clearance between them, but these dimensions may vary in different embodiments. Each segment 86 has a radially inwardly projecting drive tooth 84 that is adapted to roll into and out from the sprocket wheel sockets 28 and to travel through the tooth receiving passage between the idler wheels 44, 70. The drive teeth 84 are of a sufficient depth to prevent the unintentional disengagement of the track from the sprocket wheel 22. Preferably, the drive teeth 84 are approximately 3½ inches in depth. Each of the segments 86 comprises a rigid frame 88, and each drive tooth 84 comprises a portion of this rigid frame 88 that forms a radially inwardly projecting finger 89. The drive tooth 84 also has an elastomeric covering 90 over the finger 89.

The rigid frame 88 of each segment 86 has a number of holes extending radially through it. These holes serve to reduce the weight of the track 82. The holes in the center of the segment 86, there being four such holes in the preferred embodiment shown in the drawings, also have another function. When the elastomeric covering 90 is formed around the projecting finger 89, elastomeric material is molded around the finger 89 and through the four holes to surround the finger 89 both on the upper and the lower surfaces of the rigid frame 88. The molded elastomeric material forms the elastomeric covering 90 over the finger 89 on the upper surface of the rigid frame 88 and also forms an elastomeric pad 92 extending radially outwardly from the lower surface of the rigid frame 88 beneath the drive tooth 84.

Preferably, the elastomeric covering 90 has two portions, one that covers the finger 89 and another that extends horizontally outwardly from the finger 89 to cover transverse contact portions of the rigid frame 88. This second, contact, portion of the elastomeric covering 90 is the part of the track 82 on which the idler wheels 44, 70 rotate and which contacts the flange portions 32 of the two annular rims 31, 32 of the sprocket wheel 22 and the flanges of the webs 40 (in the embodiment shown in FIG. 11). Thus, not only is support provided for the track 82 (by the rims 31, 32, the webs 40, and the idler wheels 44, 70), but also both the track 82 and the elements providing support are protected by the elastomeric covering 90 from wear due to friction. The portion of the elastomeric covering 90 over the finger 89 similarly protects the track 82, the sprocket wheel 22, and the webs 40 from wear as the drive teeth 84 intermesh with the sprocket wheel 22 and translate rotation of the sprocket wheel 22 into movement of the track 82 about the sprocket wheel 22 and the idler wheels 44, 70.

When the covering 90 itself or the pad 92 beneath the drive tooth 84 becomes worn, it is a simple matter to recondition the track segment 86. The old elastomeric material can easily be removed, and new elastomeric material may be molded onto the rigid frame 88 so that it covers both the upper and lower surfaces. The elastomeric material may be injection molded onto the frame 88 either from the top or from the bottom since the material moves through the holes in the frame 88. The result is an upper covering 90 and a lower pad 92 that form one continuous piece of molded material.

Preferably, the segments 86 of the track 82 are secured together by two endless belts 94, each of which is attached to each segment 86 and is substantially circumferentially coextensive with the track 82. The belts 94 are attached to opposite sides of each segment 86 by means of the rivets 96 and mounting plate 98 shown in the drawings, or similar conventional fasteners, and can be easily replaced, as necessary. A drive tooth 84 projects upwardly from the center of each segment 86 and between the two belts 94.

The preferred construction of the belts 94 is most clearly shown in FIGS. 16-19. Each belt 94 is manufactured in four separate sections. Each section has a main portion and two end portions, each end portion being approximately one or two inches in length. The main portion of each section comprises an elastomeric material reinforced by at least one steel cable. In the preferred embodiment shown in FIGS. 16-19, the elastomeric jacket 100 is reinforced by four steel cables 104 that extend longitudinally over the entire length of the main portion and into the end portions. The main portion is further reinforced by nylon cording 102 that is wrapped transversely around the steel cables 104 over the entire length of the main portion and that is in contact with side portions of the steel cables 104 over such entire length. The elastomeric jacket 100 surrounds both the cables 104 and the nylon cording 102 and has a rectangular outer cross-sectional shape.

Each end portion of each section of the belt 94 comprises a rectangular steel block 106 that is swaged onto the ends of the steel cables 104 that protrude from the end of the main portion of the section. This steel block 106 has an elastomeric cover 108 that is a continuation of the elastomeric jacket 100 of the main portion of the section. Therefore, in the finished section, the only material that is visible is the elastomeric material that forms the elastomeric cover 108 and the elastomeric jacket 100. FIG. 19 shows an end fragment of a section of the belt 94. It illustrates how the steel block 106 is secured to the steel cables 104. In addition, portions of the elastomeric jacket 100 and nylon cording 102 of the adjacent fragment of the main portion of the section have been peeled away to expose the inner structure of the main portion.

In order to join the sections of the belt 94 together, the ends of the two sections to be joined are simply fastened to the same track segment 86. To accomplish this, each end portion of each belt section has two holes extending vertically therethrough. These are placed over corresponding holes in the track segment 86, and the mounting plate 98, which has four aligned vertical holes, is placed over the belt ends to be joined. Then, the track segment 86, belt ends, and mounting plate 98 are fastened together by rivets, by bolts 97 and nuts 99, as shown in FIG. 16, or by some other suitable fasteners. It is generally preferable to use the bolts 97 and nuts 99 on at least one junction of two sections so that the sections may be easily connected or disconnected without special tools.

The various components of the track laying attachment 2 may be made from a variety of suitable materials. In the preferred embodiments, the shaft 12 is basically a hollow metal tube, the sprocket wheel 22 and the rigid frame 88 of each segment 86 of the track 82 are made of a cast aluminum alloy, the track supporting frame 42 is made from metal plates, and the idler wheels 44, 70 have metal hubs and spokes and a metal rim with an outer layer of rubber or a rubber-like material. These materials and details of construction are cited by way of example only and are not intended to be interpreted as limitations on the scope of the invention.

The track laying attachment 2 adapts to most ¾ ton four wheel drive vehicles. As stated above, it can be easily attached to the vehicle without modification of the vehicle. The assembling of the parts of the attachment 2 and the actual attachment to the vehicle can be accomplished in approximately 3 hours. No special tools are necessary; only the tools normally found with the vehicle are needed.

Although the preferred embodiments of this invention have been illustrated and described, it is to be understood that various modifications may be made without departing from the spirit and scope of the present invention as defined in the following claims.

I claim:

1. A track laying attachment comprising:
    a shaft having inner and outer ends and a mounting flange at its inner end adapted to be secured to a wheel hub of a vehicle, so as to be rotatable with the wheel hub, said outer end of the shaft being threaded;
    a sprocket wheel secured to the shaft, so as to rotate with the shaft, said sprocket wheel comprising evenly spaced apart, tooth-receiving sockets at its periphery bounded by bearing surfaces;
    a track supporting frame including an upper portion and a lower portion;
    mounting means for mounting the shaft on the upper portion of the frame; said mounting means including a pillow block mount on each side of the sprocket wheel, one of such pillow block mounts including a threaded member in threaded engagement with the outer end of the shaft, and bearing means engaging the shaft, which bearing means comprises antifriction bearing means housed within each pillow block mount, each such antifriction bearing means surrounding the shaft and including a portion that rotates with the shaft and a non-rotating portion;
    idler wheel means mounted on the lower portion of the frame, said idler wheel means including portions defining a tooth-receiving passage; and
    an endless track extending about the sprocket wheel and the idler wheel means and including a multiplicity of radially inwardly projecting drive teeth adapted to roll into and out from the sprocket wheel sockets and to travel through the tooth-receiving passage, said drive teeth being of sufficient depth to prevent disengagement of the track from the sprocket wheel.

2. A track laying attachment as described in claim 1, wherein the sprocket wheel further comprises two annular rims, each of said rims including an inner radially extended portion attached to said bearing surfaces and a flange portion extending normal to and outwardly from said inner portion, said flange portions contacting and providing support for the track as the drive teeth roll into and out from the sprocket wheel sockets.

3. A track laying attachment as described in claim 1, wherein:
    the track includes a multiplicity of transverse segments, said segments being secured together, amd each of said segments comprising a rigid frame; and
    each segment includes a drive tooth, which comprises a portion of said rigid frame forming a radially inwardly projecting finger, and an elastomeric covering over said finger.

4. A track laying attachment as described in claim 3, wherein:
    said rigid frame includes at least one hole extending radially therethrough; and
    elastomeric material is molded around said finger and through said hole to surround said finger and form said elastomeric covering and an elastomeric pad extending radially outwardly from said rigid frame beneath the drive tooth.

5. A track laying attachment as described in claim 1, in which the track includes a multiplicity of transverse segments, said segments being secured together by at least the endless belt that is attached to each segment and is substantially circumferentially coextensive with the track.

6. A track laying attachment as described in claim 5, in which the belt comprises an elastomeric material reinforced by at least one steel cable.

7. A track laying attachment as described in claim 5, wherein:
    each of said segments comprises a rigid frame with at least one hole extending radially therethrough;
    each segment includes a drive tooth, which comprises a portion of said rigid frame forming a radially inwardly projecting finger, and an elastomeric covering over said finger; and
    elastomeric material is molded around said finger and through said hole to surround said finger and form said elastomeric covering and an elastomeric pad extending radially outwardly from said rigid frame beneath the drive tooth.

8. A track laying attachment as described in claim 4 or claim 7, wherein:
    the elastomeric covering has a finger portion that covers said finger, and a contact portion that extends outwardly from said finger portion to cover transverse contact portions of said rigid frame; and the sprocket wheel further comprises two annular rims, each of said rims including an inner radially extended portion attached to said bearing surfaces and a flange portion extending normal to and outwardly from said inner portion, said flange portions contacting said contact portions of the elastomeric covering and providing support for the track as the drive teeth roll into and out from the sprocket wheel sockets.

9. A track laying attachment as described in claim 1, in which the idler wheel means comprises a plurality of coaxial pairs of idler wheels with the two wheels in each pair being spaced apart axially to define said tooth-receiving passage between them.

10. A track laying attachment as described in claim 9 wherein said tooth-receiving passage is sufficiently narrow to provide a guide for the drive teeth and prevent any substantial lateral wobbling of the track.

11. A track laying attachment as described in claim 8, in which the idler wheel means comprises a plurality of coaxial pairs of idler wheels with the two wheels in each pair being spaced apart axially and rotating on opposite sides of the contact portions of the elastomeric coverings of the segments of the track to define said tooth-receiving passage and provide a guide for the drive teeth that is sufficiently narrow to prevent any substantial lateral wobbling of the track.

12. A track laying attachment as described in claim 1, in which:

the idler wheel means includes spaced-apart front and rear wheel means;

the sprocket wheel is positioned above and generally between said front and rear wheel means to form a triangle with said front and rear wheel means; and the frame includes front and rear portions extending between the sprocket wheel and said front and rear wheel means, respectively, and having surface portions closely adjacent to portions of the track between the sprocket wheel and said front and rear wheel means, to prevent more than very slight sagging of the track between the sprocket wheel and each of said front and rear wheel means.

13. A track laying attachment as described in claim 12, in which said front and rear portions of the frame each include a U-shaped channel through which the drive teeth travel, and a laterally extending flange on each side of said channel that is closely adjacent to the track adjacent to the bases of the drive teeth; said channel serving as a lateral guide for the drive teeth to secure the track against lateral wobbling.

14. A track laying attachment as described in claim 2, further comprising scraper blade means extending into at least one side of the sprocket wheel through the center of said annular rim to scrape any accumulated snow or debris from the sides of the sprocket wheel and its sockets.

15. A track laying attachment as described in claim 1, in which the base of each socket of the sprocket wheel has a wedge-shaped blade projecting radially outwardly therefrom to shear off snow that enters the socket and inhibit the accumulation of snow in the socket.

16. A track laying attachment comprising:

a shaft having inner and outer ends and a mounting flange at its inner end adapted to be secured to a wheel hub of a vehicle, so as to be rotatable with the wheel hub; said mounting flange extending radially outwardly from the inner end of the shaft; and said outer end of the shaft being threaded;

a sprocket wheel secured to the shaft, so as to rotate with the shaft, said sprocket wheel comprising evenly spaced apart, tooth-receiving sockets at its periphery bounded by bearing surfaces;

a track supporting frame including an upper portion and a lower portion;

mounting means for mounting the shaft on the upper portion of the frame; said mounting means comprising a pillow block mount on each side of the sprocket wheel, one of such pillow block mounts including a threaded member in threaded engagement with the outer end of the shaft, and bearing means engaging the shaft, which bearing means comprises antifriction bearing means housed within each pillow block mount, each such antifriction bearing means surrounding the shaft and including a portion that rotates with the shaft and a non-rotating portion;

idler wheel means mounted on the lower portion of the frame, said idler wheel means including portions defining a tooth-receiving passage; and an endless track extending about the sprocket wheel and the idler wheel means and including a multiplicity of radially inwardly projecting drive teeth adapted to roll into and out from the sprocket wheel sockets and to travel through the tooth-receiving passage, said drive teeth being of sufficient depth to prevent disengagement of the track from the sprocket wheel.

17. A track laying attachment comprising:

a shaft having inner and outer ends and a mounting flange at its inner end adapted to be secured to a wheel hub of a vehicle, so as to be rotatable with the wheel hub, said outer end of the shaft being threaded;

a sprocket wheel secured to the shaft, so as to rotate with the shaft;

a pillow block mount on each side of the sprocket wheel, surrounding the shaft; one of such pillow block mounts including a threaded member in threaded engagement with the outer end of the shaft;

antifriction bearing means housed within each pillow block mount, each such bearing means surrounding the shaft and including a portion which rotates with the shaft and a non-rotating portion;

a track supporting frame including an upper portion to which the pillow block mounts are secured, and a lower portion;

idler wheel means mounted on the lower portion of the frame; and an endless track extending about the sprocket wheel and the idler wheel means and including portions that intermesh with the sprocket wheel to translate rotation of the sprocket wheel into movement of the track about the sprocket wheel and idler wheel means.

* * * * *

UNITED STATES PATENT AND TRADEMARK OFFICE
CERTIFICATE OF CORRECTION

PATENT NO. : 4,448,273
DATED : May 15, 1984
INVENTOR(S) : Louis C. Barbieri

It is certified that error appears in the above-identified patent and that said Letters Patent are hereby corrected as shown below:

Column 2, line 59, "elastomer" should be --elastomeric--.
Column 4, line 4, --taken-- should be added following "track".
Column 12, line 28, "amd" should be --and--.
Column 12, line 46, "the" should be --one--.

Signed and Sealed this

Ninth Day of October 1984

[SEAL]

Attest:

GERALD J. MOSSINGHOFF

Attesting Officer

Commissioner of Patents and Trademarks